United States Patent [19]

Minakuchi et al.

[11] Patent Number: 5,472,538
[45] Date of Patent: Dec. 5, 1995

[54] PROCESS FOR PRODUCING PHASE RETARDER FILM

[75] Inventors: Keiichi Minakuchi, Toyonaka; Hideki Shimomura, Funabashi; Kazuaki Sakakura, Moriguchi, all of Japan

[73] Assignee: Sumitomo Chemical Co., Ltd., Osaka, Japan

[21] Appl. No.: 361,549

[22] Filed: Dec. 22, 1994

[30] Foreign Application Priority Data

Dec. 22, 1993 [JP] Japan .................................. 5-324530

[51] Int. Cl.$^6$ .......................... B32B 31/00; B29C 61/02; G02F 1/1333
[52] U.S. Cl. .......................... 156/85; 156/229; 264/230; 359/73
[58] Field of Search .............................. 359/73, 494, 500, 359/900; 264/2.2, 1.3 R, 342 R, DIG. 71, 230; 156/84, 86, 85

[56] References Cited

U.S. PATENT DOCUMENTS 5,245,456  9/1993  Yoshimi et al. ........................ 359/73
5,366,682  11/1994  Morikawa et al. ..................... 264/230

FOREIGN PATENT DOCUMENTS 2160204  6/1990  Japan ............................... G02B 5/30
2191904  7/1990  Japan ............................... G02B 5/30

*Primary Examiner*—Michael W. Ball
*Assistant Examiner*—David W. Reed
*Attorney, Agent, or Firm*—Sughrue, Mion, Zinn, Macpeak & Seas

[57] ABSTRACT

A process for producing a phase retarder film, which comprises laminating a heat-shrinkable film on at least one side of a uniaxially stretched thermoplastic resin film so that the heat shrinkage axis direction of said heat-shrinkable film becomes perpendicular to the stretching axis direction of said uniaxially stretched thermoplastic resin film, subjecting the resulting laminate to heat shrinkage, and then peeling and removing the heat-shrinkable film. An object of the present invention is to provide a process for providing a phase retarder film having a desired $R_{40}/R_0$ value and a desired retardation value, easily and at a high efficiency.

14 Claims, No Drawings

PROCESS FOR PRODUCING PHASE RETARDER FILM

BACKGROUND OF THE INVENTION

1. Field of the Invention

The present invention relates to a process for producing a phase retarder film.

2. Description of the Related Art

It is known that the viewing angle characteristic of a liquid crystal display device depends largely upon the angular dependence of the birefringence of a combination of, for example, a liquid crystal cell, a polarizing plate and a phase retarder film, used in the display device and that such a viewing angle characteristic of smaller value gives a superior result. Depending upon the constitution of the liquid crystal display device, there are cases that the phase retarder film used in the display device must have by itself a small angular dependence of birefringence, i.e. retardation.

The angular dependence of retardation of a phase retarder film is expressed by a retardation ratio $R_{40}/R_0$. In this case, the retardation $R_{40}$ is a value measured with the phase retarder film being tilted by 40° from the horizontal condition by rotating around an axis which corresponds to the slow axis if the phase retarder film is made of a thermoplastic resin having a positive intrinsic birefringence, or to the fast axis if the phase retarder film is made of a thermoplastic resin having a negative intrinsic birefringence; the retardation $R_0$ is a value measured with the phase retarder film not being tilted (i.e. arranged horizontally); and the measurement is made using a polarizing microscope equipped with a Sénarmont compensator. (In the present invention, mere description of "retardation value" refers to $R_0$.) As the retardation ratio of a phase retarder film is closer to 1, its angular dependence of retardation is smaller.

In order to allow a combination of a liquid crystal cell, a polarizing plate and a phase retarder film to have a small angular dependence of birefringence, it is necessary to control the $R_{40}/R_0$ value of the phase retarder film depending upon the liquid crystal cell and the polarizing plate both used together with the phase retarder film.

For production of a phase retarder film having a small angular dependence of retardation, various processes are known, such as a process which comprises stretching a film whose molecules are orientated in a direction normal to the film surface [Japanese Patent Kokai (Laid-Open) No. 2-160204] and a process which comprises stretching a film produced from a molten polymer or a polymer solution in an electric field applied [Japanese Patent Kokai (Laid-Open) No. 2-285303]. These processes, however, are not satisfactory in efficiency. A process is also known which comprises adhering a shrinkable film to a resin film and subjecting the resulting laminate to thermal stretching [Japanese Patent Kokai (Laid-Open) No. 5-157911]. This process is slightly improved in the above point. As liquid crystal display devices have found wider applications in recent years, the phase retarder film used therein must have various retardation values so as to satisfy the requirements of the applications. In such a situation, the above process, however, is not fully satisfactory. Thus, there has been desired a process capable of producing a phase retarder film having a desired retardation value satisfying the intended application of a liquid crystal display device comprising said phase retarder film.

There has also been desired a process capable of producing a phase retarder film having a desired $R_{40}/R_0$, in order to allow a combination of a liquid crystal cell, a polarizing plate and said phase retarder film to have a small angular dependence of birefringence.

SUMMARY OF THE INVENTION

An object of the present invention is to provide a process for providing a phase retarder film having a desired $R_{40}/R_0$ value and a desired retardation value, easily and at a high efficiency.

Other object of the present invention is to provide a process for producing a phase retarder film having a small angular dependence of retardation and a desired retardation value, easily and at a high efficiency.

These and other objects of the present invention become apparent from the following description.

The present inventors made a study on the process for producing a phase retarder film and found out that the above objects can be achieved by laminating a heat-shrinkable film on a uniaxially stretched thermoplastic film in a particular direction relationship and subjecting the resulting laminate to heat shrinkage. This and further studies have led to the completion of the present invention.

The present invention relates to a process for producing a phase retarder film, which comprises laminating a heat-shrinkable film on at least one side of a uniaxially stretched thermoplastic resin film so that the heat shrinkage axis direction of said heat-shrinkable film becomes perpendicular to the stretching axis direction of said uniaxially stretched thermoplastic resin film, subjecting the resulting laminate to heat shrinkage, and then peeling and removing the heat-shrinkable film.

The present invention relates also to a process for producing a phase retarder film, which comprises laminating a heat-shrinkable film on at least one side of a uniaxially stretched thermoplastic resin film so that the heat shrinkage axis direction of said heat-shrinkable film becomes perpendicular to the stretching axis direction of said uniaxially stretched thermoplastic resin film, and then heat-equilibrating said heat-shrinkable film.

DETAILED DESCRIPTION OF THE INVENTION

The present invention is hereinafter described in detail.

When a heat-shrinkable film is laminated on at least one side of a uniaxially stretched thermoplastic resin film so that the heat shrinkage axis direction of the heat-shrinkable film becomes perpendicular to the stretching axis direction of the uniaxially stretched thermoplastic resin film and the resulting laminate is heated, the uniaxially stretched thermoplastic resin film shrinks in the stretching axis direction and further, in a direction perpendicular to the stretching axis direction, shrinks or is inhibited to expand; thus, the uniaxially stretched thermoplastic resin film after the above treatment has a varied retardation ratio ($R_{40}/R_0$) and/or a varied retardation value. In other words, the processing parameters can be altered to yield uniform films which have properties differing from each other.

The thermoplastic resin used in the uniaxially stretched thermoplastic resin film may be a thermoplastic resin having a positive or negative intrinsic birefringence. However, it preferably has excellent optical properties (e.g. excellent transparency).

The resin having a positive intrinsic birefringence is a resin which, when stretched, increases in the refractive index of the stretching axis direction; and the resin having a negative intrinsic birefringence is a resin which, when stretched, decreases in the refractive index of the stretching axis direction.

The thermoplastic resin having a positive intrinsic birefringence includes, for example, polycarbonate, polysulfone, a polyarylate, polyethersulfone, polyvinyl alcohol and cellulose acetate. The thermoplastic resin having a negative intrinsic birefringence includes, for example, polystyrene, a styrene-maleic anhydride copolymer, polymethylmethacrylate, poly-α-methylstyrene, polyvinylpyridine and polyvinylnaphthalene. Of these, polycarbonate, polysulfone, a polyarylate, and polystyrene, are preferable in view of the optical properties.

The uniaxially stretched thermoplastic resin film can be obtained by subjecting a thermoplastic resin film produced, for example, by so-called solvent casting, to uniaxial stretching by a method such as longitudinal uniaxial stretching method, transverse uniaxial stretching method or the like. The stretching ratio is, for example, about 1.2- to 3-fold.

The thickness of the uniaxially stretched thermoplastic resin film is, for example, about 20–200 μm. Its retardation value [product of birefringent index (Δn) and thickness (d)] is, for example, about 100–1,000 nm.

The heat-shrinkable film refers to a film which generally shrinks when heated to or above the softening point or the glass transition temperature.

The heat-shrinkable film includes, for example, uniaxially stretched films obtained by stretching between rolls, or the like, and biaxially stretched films obtained by a tubular method, a tenter method or the like. Specific examples of the heat-shrinkable film are uniaxially or biaxially stretched films made of a polyester resin, a polypropylene resin, a polycarbonate resin, a polystyrene resin, a polysulfone resin, a polyamide resin, a polyethylene resin, a cellulose acetate resin or the like.

The heat shrinkage axis direction of a heat-shrinkable film refers to a direction in which the film results in heat shrinkage. A heat-shrinkable uniaxially stretched film results in heat shrinkage in the uniaxial stretching axis direction, and a heat-shrinkable biaxially stretched film results in heat shrinkage in the two stretching axis directions.

The lengthwise shrinkage ratio of the heat-shrinkable film when the film is subjected to heat shrinkage until it reaches the heat equilibrium (in the present invention, said lengthwise shrinkage ratio is referred to as "heat equilibrium shrinkage ratio" in some cases), varies depending upon the stretching conditions during film production, etc., but is, for example, about 5–70% at a temperature not lower than the softening point or the glass transition temperature but lower than the melting point (in the present invention, a temperature at which the film is heated is referred to as "heat shrinkage temperature" in some cases).

The thickness of the heat-shrinkable film is, for example, about 20–200 μm.

In the heat-shrinkable film, the heat equilibrium shrinkage ratio at the heat shrinkage temperature (in the case of a heat-shrinkable biaxially stretched film, the heat equilibrium shrinkage ratio in at least either one axis direction) is preferably larger than that of the uniaxially stretched thermoplastic resin film in the stretching axis direction.

The laminate between the uniaxially stretched thermoplastic resin film and the heat-shrinkable film is obtained by laminating the heat-shrinkable film on one or each side of the uniaxially stretched thermoplastic resin film so that the heat-shrinkable axis direction of the heat-shrinkable film becomes perpendicular to the stretching axis direction of the uniaxially stretched thermoplastic resin film (in the present invention, the resulting laminate is referred to simply as "laminate" in some cases). This lamination can be conducted, for example, by utilizing the adhesivities of the two films themselves or by using an adhesive such as acrylic type adhesive or the like. In the lamination, there can be used, for example, a pressure-laminating roll or a table type laminating machine.

The temperature at which the laminate is subjected to heat shrinkage, is not particularly restricted as long as it is not lower than the temperature at which the laminate begins heat shrinkage and is lower than the melting points of the films used in the laminate. The temperature can appropriately be selected depending upon the kinds of the uniaxially stretched thermoplastic resin film used in the laminate. For example, the temperature is generally 160° to 230° C. when the uniaxially stretched thermoplastic resin film is made of a polycarbonate; generally 180° to 250° C. when the thermoplastic resin film is made of a polysulfone; and generally 80° to 150° C. when the thermoplastic resin film is made of a polystyrene.

The degree of the heat shrinkage of the laminate can appropriately be determined depending upon the phase retarder film intended but is generally about 20% or less, preferably 1–10% of the laminate original length, in terms of each of the lengthwise shrinkage ratio of the uniaxially stretched thermoplastic resin film in the stretching axis direction and the lengthwise shrinkage ratio of said film in a direction perpendicular to the stretching axis. In general, the $R_{40}/R_0$ value of the phase retarder film obtained is almost determined by the areal shrinkage ratio of the laminate used which is a sum of the lengthwise shrinkage ratio of the uniaxially stretched thermoplastic resin in the stretching axis direction and the lengthwise shrinkage ratio of said film in a direction perpendicular to the stretching axis. When there is used a thermoplastic resin having a positive intrinsic birefringence, the $R_{40}/R_0$ value tends to be smaller as the areal shrinkage ratio of the resulting laminate is made larger. The reverse is true when there is used a thermoplastic resin having a negative intrinsic birefringence. The areal shrinkage ratio of the laminate is generally 40% or less, preferably 1 to 20%.

Hence, in order to make small the angular dependence of birefringence of a combination of a liquid crystal cell, a polarizing plate and a phase retarder film, the $R_{40}/R_0$ value of the phase retarder film can easily be controlled at a desired level, for example, 0.95, 1.00, 1.05 or the like by the above-mentioned approach. The $R_{40}/R_0$ value is generally in the range of 0.9 to 1.1.

The retardation value of the phase retarder film obtained can be controlled at a desired level, for example, 80–1,200 nm by controlling the retardation value of the uniaxially stretched thermoplastic resin film or the lamination direction of the heat-shrinkable film. In particular, by controlling the lamination direction of the heat-shrinkable film, a phase retarder film having a desired retardation value in a wide retardation range can easily be obtained from a uniaxially stretched thermoplastic resin film having a certain retardation value. Further, various retardation values can easily be obtained so precisely as to be different from each other only by about 10 nm.

For example, when the heat-shrinkable film is laminated on the uniaxially stretched thermoplastic resin film so that the maximum-heat-shrinkage axis direction of the former film (the uniaxial stretching axis direction in the case of a heat-shrinkable uniaxially stretched film and the heat shrinkage axis direction giving a larger heat shrinkage ratio in the case of a heat-shrinkable biaxially stretched film) becomes perpendicular to the stretching axis direction of the latter film and then the resulting laminate is subjected to heat shrinkage, there can be obtained a phase retarder film having a larger retardation value than the uniaxially stretched thermoplastic resin film.

Meanwhile, when a heat-shrinkable biaxially stretched film is laminated on the uniaxially stretched thermoplastic resin film so that the maximum-heat-shrinkage axis direction of the former film (the heat shrinkage axis direction of the former film giving a larger heat shrinkage ratio) becomes parallel to the stretching axis direction of the latter film, that is, the heat shrinkage axis direction of the former film giving a smaller heat shrinkage ratio becomes perpendicular to the stretching axis direction of the latter film, and the resulting laminate is subjected to heat shrinkage, there can be obtained a phase retarder film having a smaller retardation value than the uniaxially stretched thermoplastic resin film.

In general, when the uniaxially stretched thermoplastic film used in the laminate is subjected to heat shrinkage so that its lengthwise heat shrinkage ratio becomes larger in the stretching axis direction, the resulting film has a decreased retardation value; and when said film is subjected to heat shrinkage so that its lengthwise heat shrinkage ratio becomes larger in a direction perpendicular to the stretching axis, the resulting film has an increased retardation value. Therefore, by controlling both (1) the direction of lamination of the heat-shrinkable film and (2) the lengthwise heat shrinkage ratios of the uniaxially stretched thermoplastic resin film in the stretching axis direction and a direction perpendicular thereto, there can be obtained a phase retarder film having a desired retardation value in an even wider range. For example, a phase retarder film having a retardation value of about 150–600 nm can be obtained from a uniaxially stretched thermoplastic resin film of 300 nm; and a phase retarder film having a retardation value of about 300–1,200 nm can be obtained from a uniaxially stretched thermoplastic resin film of 600 nm.

The time of heating for heat shrinkage is not particularly restricted and can appropriately be selected depending upon the heating temperature employed, the thickness of the laminate prepared, the heat shrinkage ratio required, etc.

The heating for heat shrinkage can be conducted by the use of, for example, a tenter or a hot roll. Use of such a heating device enables the continuous heat shrinkage of the laminate.

After the heat shrinkage, the heat-shrinkable film is generally peeled and removed, whereby a phase retarder film is obtained. However, when the laminate is subjected to heat shrinkage until the heat-shrinkable film reaches its heat equilibrium shrinkage ratio (in the present invention, the heat shrinkage to said state is referred to as "thermal equilibration") and is brought to an optically transparent state, for example, a retardation value of about 0–10 nm, the heat-shrinkable film is not peeled and the laminate itself may be used as a phase retarder film.

The heat-shrinkable film used in the laminate per se used as a phase retarder film is preferably a heat-shrinkable film which is less liable to cause phase retardation, for example, a cellulose acetate film.

According to the present invention, there can easily be obtained a phase retarder film having a desired retardation value and a desired $R_{40}/R_0$ value; therefore, a desired phase retarder film can advantageously be obtained on a commercial basis.

The present invention is hereinafter described in more detail by way of Examples. However, the present invention is not restricted to these Examples.

The angular dependence of retardation of phase retarder film, i.e. $R_{40}/R_0$ was calculated from (1) a retardation value ($R_{40}$) measured with the phase retarder film being tilted by 40° from the horizontal condition by rotating around an axis which corresponded to the slow axis if the phase retarder film was made of a thermoplastic resin having a positive intrinsic birefringence, or to the fast axis if the phase retarder film was made of a thermoplastic resin having a negative intrinsic birefringence, and (2) a retardation value ($R_0$) measured with the phase retarder film not being tilted (i.e. arranged horizontally). The measurement was made using a polarizing microscope (a product of NIPPON KOGAKU K.K.) equipped with a Sénarmont compensator.

In any of Examples 1–12, the heat equilibrium shrinkage ratio of heat-shrinkable film at heat shrinkage temperature (in the case of heat-shrinkable biaxially stretched film, the heat equilibrium shrinkage ratio in at least one stretching axis direction) was larger than the heat equilibrium shrinkage ratio of uniaxially stretched thermoplastic resin film in stretching axis direction.

EXAMPLE 1

A polycarbonate film produced by solvent casting was stretched in the transverse direction by transverse uniaxial stretching to obtain a uniaxially stretched film having a thickness of 60 μm, $R_0$ of 430 nm and $R_{40}/R_0$ of 1.11.

On each side of the uniaxially stretched film was laminated a heat-shrinkable film (a biaxially stretched polycarbonate film having a thickness of about 50 μm) via an acrylic resin type adhesive so that the maximum-heat-shrinkage axis direction of the heat-shrinkable film became perpendicular to the stretching axis direction of the uniaxially stretched film. The resulting laminate was placed in a heating furnace of 170° C. to give rise to heat shrinkage (lengthwise heat shrinkage=4% in a direction perpendicular to the stretching axis of the uniaxially stretched film and 2% in the stretching axis direction of the uniaxially stretched film). Then, the heat-shrinkable film was peeled and removed to obtain a phase retarder film made of polycarbonate, having a thickness of 64 μm, $R_0$ of 570 nm and $R_{40}/R_0$ of 0.96.

EXAMPLE 2

On one side of the same uniaxially stretched film as used in Example 1 was laminated a heat-shrinkable film (a biaxially stretched polycarbonate film having a thickness of about 50 μm) via an acrylic resin type adhesive so that the maximum-heat-shrinkage axis direction of the heat-shrinkable film became perpendicular to the stretching axis direction of the uniaxially stretched film. The resulting laminate was placed in a heating furnace of 165° C. to give rise to heat shrinkage (lengthwise heat shrinkage=2% in a direction perpendicular to the stretching axis of the uniaxially stretched film and 1% in the stretching axis direction of the uniaxially stretched film). Then, the heat-shrinkable film was peeled and removed to obtain a phase retarder film made of polycarbonate, having a thickness of 62 μm, $R_0$ of 540 nm and $R_{40}/R_0$ of 0.99.

EXAMPLE 3

A polycarbonate film produced by solvent casting was stretched in the transverse direction by transverse uniaxial stretching to obtain a uniaxially stretched film having a thickness of 80 µm, $R_0$ of 370 nm and $R_{40}/R_0$ of 1.10.

On each side of the uniaxially stretched film was laminated a heat-shrinkable film (a uniaxially stretched polycarbonate film having a thickness of about 50 µm) via an acrylic resin type adhesive so that the heat-shrinkage axis direction of the heat-shrinkable film became perpendicular to the stretching axis direction of the uniaxially stretched film. The resulting laminate was placed in a heating furnace of 165° C. to give rise to heat shrinkage (lengthwise heat shrinkage=4% in a direction perpendicular to the stretching axis of the uniaxially stretched film and 0% in the stretching axis direction of the uniaxially stretched film). Then, the heat-shrinkable film was peeled and removed to obtain a phase retarder film made of polycarbonate, having a thickness of 83 µm, $R_0$ of 460 nm and $R_{40}/R_0$ of 1.03.

EXAMPLE 4

A polycarbonate film produced by solvent casting was stretched in the longitudinal direction by longitudinal uniaxial stretching to obtain a uniaxially stretched film having a thickness of 55 µm, $R_0$ of 650 nm and $R_{40}/R_0$ of 1.09.

On each side of the uniaxially stretched film was laminated a heat-shrinkable film (a biaxially stretched cellulose acetate film having a thickness of about 50 µm) via an acrylic resin type adhesive so that the maximum-heat-shrinkage axis direction of the heat-shrinkable film became parallel to the stretching axis direction of the uniaxially stretched film. The resulting laminate was placed in a heating furnace of 180° C. to give rise to heat shrinkage (lengthwise heat shrinkage=1% in a direction perpendicular to the stretching axis of the uniaxially stretched film and 6% in the stretching axis direction of the uniaxially stretched film). Then, the heat-shrinkable film was peeled and removed to obtain a phase retarder film made of polycarbonate, having a thickness of 59 µm, $R_0$ of 360 nm and $R_{40}/R_0$ of 0.95.

EXAMPLE 5

A polycarbonate film produced by solvent casting was stretched in the longitudinal direction by longitudinal uniaxial stretching to obtain a uniaxially stretched film having a thickness of 50 µm, $R_0$ of 330 nm and $R_{40}/R_0$ of 1.10.

On one side of the uniaxially stretched film was laminated a heat-shrinkable film (a biaxially stretched cellulose acetate film having a thickness of about 50 µm) via an acrylic resin type adhesive so that the maximum-heat-shrinkage axis direction of the heat-shrinkable film became perpendicular to the stretching axis direction of the uniaxially stretched film. The resulting laminate was placed in a heating furnace of 180° C. to thermally equilibrate the heat-shrinkable film (lengthwise heat shrinkage=3% in a direction perpendicular to the stretching axis of the uniaxially stretched film and 1% in the stretching axis direction of the uniaxially stretched film) to obtain a phase retarder film made of a polycarbonate film covered with an optically transparent biaxially stretched cellulose acetate film having a $R_o$ of 0 nm. The phase retarder film had a thickness of 130 µm, $R_0$ of 430 nm and $R_{40}/R_0$ of 0.97.

EXAMPLE 6

A polysulfone film produced by solvent casting was stretched in the transverse direction by transverse uniaxial stretching to obtain a uniaxially stretched film having a thickness of 60 µm, $R_0$ of 350 nm and $R_{40}/R_0$ of 1.10.

On each side of the uniaxially stretched film was laminated a heat-shrinkable film (a biaxially stretched polycarbonate film having a thickness of about 50 µm) via an acrylic resin type adhesive so that the maximum-heat-shrinkage axis direction of the heat-shrinkable film became perpendicular to the stretching axis direction of the uniaxially stretched film. The resulting laminate was placed in a heating furnace of 230° C. to give rise to heat shrinkage (lengthwise heat shrinkage=2% in a direction perpendicular to the stretching axis of the uniaxially stretched film and 1% in the stretching axis direction of the uniaxially stretched film). Then, the heat-shrinkable film was peeled and removed to obtain a phase retarder film made of polysulfone, having a thickness of 62 µm, $R_0$ of 450 nm and $R_{40}/R_0$ of 1.00.

EXAMPLE 7

A polysulfone film produced by solvent casting was stretched in the longitudinal direction by longitudinal uniaxial stretching to obtain a uniaxially stretched film having a thickness of 60 µm, $R_0$ of 700 nm and $R_{40}/R_0$ of 1.09.

On each side of the uniaxially stretched film was laminated a heat-shrinkable film (a biaxially stretched polyester film having a thickness of about 50 µm) via an acrylic resin type adhesive so that the maximum-heat-shrinkage axis direction of the heat-shrinkable film became parallel to the stretching axis direction of the uniaxially stretched film. The resulting laminate was placed in a heating furnace of 235° C. to give rise to heat shrinkage (lengthwise heat shrinkage=0% in a direction perpendicular to the stretching axis of the uniaxially stretched film and 6% in the stretching axis direction of the uniaxially stretched film). Then, the heat-shrinkable film was peeled and removed to obtain a phase retarder film made of polysulfone, having a thickness of 62 µm, $R_0$ of 380 nm and $R_{40}/R_0$ of 0.96.

EXAMPLE 8

A polystyrene film produced by solvent casting was stretched in the longitudinal direction by longitudinal uniaxial stretching to obtain a uniaxially stretched film having a thickness of 70 µm, $R_0$ of 370 nm and $R_{40}/R_0$ of 0.90.

On each side of the uniaxially stretched film was laminated a heat-shrinkable film (a biaxially stretched polystyrene film having a thickness of about 50 µm) via an acrylic resin type adhesive so that the maximum-heat-shrinkage axis direction of the heat-shrinkable film became perpendicular to the stretching axis direction of the uniaxially stretched film. The resulting laminate was placed in a heating furnace of 95° C. to give rise to heat shrinkage (lengthwise heat shrinkage=2% in a direction perpendicular to the stretching axis of the uniaxially stretched film and 1% in the stretching axis direction of the uniaxially stretched film). Then, the heat-shrinkable film was peeled and removed to obtain a phase retarder film made of polysulfone, having a thickness of 72 µm, $R_0$ of 440 nm and $R_{40}/R_0$ of 1.00.

Comparative Example 1

A polycarbonate film produced by solvent casting was stretched in the longitudinal direction by longitudinal uniaxial stretching to obtain a uniaxially stretched film having a thickness of 55 μm, $R_0$ of 650 nm and $R_{40}/R_0$ of 1.09.

The uniaxially stretched film was placed in a heating furnace of 180° C. to give rise to heat shrinkage (lengthwise expansion ratio in a direction perpendicular to the stretching axis of the uniaxially stretched film: 3%, and lengthwise shrinkage ratio in the stretching axis direction of the uniaxially stretched film: 6%) to obtain a phase retarder film made of polycarbonate, having a thickness of 56 μm, $R_0$ of 350 nm and $R_{40}/R_0$ of 1.11.

TABLE 1

| | Uniaxially stretched thermoplastic resin film used as material | | | Phase retarder film produced | | |
|---|---|---|---|---|---|---|
| | Thickness (μm) | $R_0$ (nm) | $R_{40}/R_0$ | Thickness (μm) | $R_0$ (nm) | $R_{40}/R_0$ |
| Example 1 | 60 | 430 | 1.11 | 64 | 570 | 0.96 |
| Example 2 | 60 | 430 | 1.11 | 62 | 540 | 0.99 |
| Example 3 | 80 | 370 | 1.10 | 83 | 460 | 1.03 |
| Example 4 | 55 | 650 | 1.09 | 59 | 360 | 0.95 |
| Example 5 | 50 | 330 | 1.10 | 130 | 430 | 0.97 |
| Example 6 | 60 | 350 | 1.10 | 62 | 450 | 1.00 |
| Example 7 | 60 | 700 | 1.09 | 62 | 380 | 0.96 |
| Example 8 | 70 | 370 | 0.90 | 72 | 440 | 1.00 |
| Comparative Example 1 | 55 | 650 | 1.09 | 56 | 350 | 1.11 |

EXAMPLES 9–10

Phase retarder films were obtained in the same manner as in Example 2 except that the heat shrinkage of laminate was conducted under the conditions shown in Table 2. The results are shown in Table 2.

EXAMPLES 11–12

Phase retarder films were obtained in the same manner as in Example 4 except that the heat shrinkage of laminate was conducted under the conditions shown in Table 3. The results are shown in Table 3.

TABLE 2

| | Longitudinal heat shrinkage ratio | | Phase retarder film | | |
|---|---|---|---|---|---|
| | Perpendicular direction*[1] (%) | Stretching direction*[2] (%) | Thickness (μm) | $R_0$ (nm) | $R_{40}/R_0$ |
| Example 2 | 2 | 1 | 62 | 540 | 0.99 |
| Example 9 | 3 | 2 | 63 | 540 | 0.96 |
| Example 10 | 4 | 3 | 64 | 540 | 0.93 |

TABLE 2-continued

*[1]Longitudinal heat shrinkage ratio in direction perpendicular to uniaxial stretching axis of laminate.
*[2]Longitudinal heat shrinkage ratio in uniaxial stretching axis direction of laminate.

TABLE 3

| | Longitudinal heat shrinkage ratio | | Phase retarder film | | |
|---|---|---|---|---|---|
| | Perpendicular direction*[1] (%) | Stretching direction*[2] (%) | Thickness (μm) | $R_0$ (nm) | $R_{40}/R_0$ |
| Example 4 | 1 | 6 | 59 | 360 | 0.95 |
| Example 11 | 1.5 | 5 | 59 | 400 | 0.95 |
| Example 12 | 2 | 4 | 59 | 450 | 0.95 |

*[1]: Same as in Table 2.
*[2]: Same as in Table 2.

What is claimed is:

1. A process for producing a phase retarder film, which comprises laminating a heat-shrinkable film on at least one side of a uniaxially stretched thermoplastic resin film so that the heat shrinkage axis direction of said heat-shrinkable film becomes perpendicular to the stretching axis direction of said uniaxially stretched thermoplastic resin film, subjecting the resulting laminate to heat shrinkage, and then peeling and removing the heat-shrinkable film.

2. A process according to claim 1, wherein the uniaxially stretched thermoplastic resin film is made of one member selected from the group consisting of polycarbonate, polysulfone, polyarylate and polystyrene.

3. A process according to claim 1, wherein the heat-shrinkable film is a heat-shrinkable uniaxially stretched film or a heat-shrinkable biaxially stretched film.

4. A process according to claim 3, wherein the heat-shrinkable uniaxially stretched film or the heat-shrinkable biaxially stretched film is made of one member selected from the group consisting of a polyester resin, a polypropylene resin, a polycarbonate resin, a polystyrene resin, a polysulfone resin, a polyamide resin, a polyethylene resin and a cellulose acetate resin.

5. A process according to claim 3, wherein the heat-shrinkable film is a heat-shrinkable biaxially stretched film.

6. A process according to claim 5, wherein the lamination is conducted so that the direction of the heat-shrinkable biaxially stretched film giving a larger heat shrinkage ratio becomes parallel to the stretching direction of the uniaxially stretched thermoplastic resin film.

7. A process according to claim 3, wherein the lamination is conducted so that the stretching direction of the heat-shrinkable uniaxially stretched film or the direction of the heat-shrinkable biaxially stretched film giving a larger heat shrinkage ratio becomes perpendicular to the stretching direction of the uniaxially stretched thermoplastic resin film.

8. A process for producing a phase retarder film, which comprises laminating a heat-shrinkable film on at least one side of a uniaxially stretched thermoplastic resin film so that the heat shrinkage axis direction of said heat-shrinkable film becomes perpendicular to the stretching axis direction of said uniaxially stretched thermoplastic resin film, and then heat-equilibrating said heat-shrinkable film.

9. A process according to claim 8, wherein the uniaxially stretched thermoplastic resin film is made of one member selected from the group consisting of polycarbonate, polysulfone, polyarylate and polystyrene.

10. A process according to claim 8, wherein the heat-shrinkable film is a heat-shrinkable uniaxially stretched film or a heat-shrinkable biaxially stretched film.

11. A process according to claim 10, wherein the heat-shrinkable uniaxially stretched film or the heat-shrinkable biaxially stretched film is made of a cellulose acetate resin.

12. A process according to claim 10, wherein the heat-shrinkable film is a heat-shrinkable biaxially stretched film.

13. A process according to claim 12, wherein the lamination is conducted so that the direction of the heat-shrinkable biaxially stretched film giving a larger heat shrinkage ratio becomes parallel to the stretching direction of the uniaxially stretched thermoplastic resin film.

14. A process according to claim 10, wherein the lamination is conducted so that the stretching direction of the heat-shrinkable uniaxially stretched film or the direction of the heat-shrinkable biaxially stretched film giving a larger heat shrinkage ratio becomes perpendicular to the stretching direction of the uniaxially stretched thermoplastic resin film.

\* \* \* \* \*